United States Patent [19]
Van Becelaere

[11] Patent Number: 6,129,113
[45] Date of Patent: Oct. 10, 2000

[54] AIR FLOW MEASUREMENT STATION WITH ORTHOGONALLY MOUNTED DAMPER

[75] Inventor: Robert M. Van Becelaere, Lake Lotawana, Mo.

[73] Assignee: Tomkins Industries, Inc., Dayton, Ohio

[21] Appl. No.: 09/174,510

[22] Filed: Oct. 16, 1998

[51] Int. Cl.[7] .................................................. F16K 37/00
[52] U.S. Cl. ........................................ 137/557; 73/861.66
[58] Field of Search ........................ 137/557; 73/861.62, 73/861.66; 454/335

[56] References Cited

U.S. PATENT DOCUMENTS

| | | | |
|---|---|---|---|
| 3,286,732 | 11/1966 | Alley | 454/335 X |
| 3,640,307 | 2/1972 | Drzala | 137/557 |
| 4,444,060 | 4/1984 | Yamamoto | 73/861.66 |
| 4,594,888 | 6/1986 | DeBaun et al. | 73/861.66 X |
| 4,768,386 | 9/1988 | Taddeo | 73/861.66 |
| 5,379,792 | 1/1995 | Van Becelaere | 137/12 |
| 5,402,687 | 4/1995 | Brandt, Jr. | 73/861.66 |
| 5,730,652 | 3/1998 | Van Becelaere | 454/335 |

*Primary Examiner*—John Rivell
*Attorney, Agent, or Firm*—Shughart Thomson & Kilroy L.C.

[57] ABSTRACT

An air flow measurement station with orthogonally mounted damper includes a station housing which encloses a damper with a plurality of movable damper blades. The damper blades are oriented in a substantially horizontal direction. The housing also encloses a plurality of air flow sensing vanes which are oriented in a second direction orthogonal to the first direction. With this orientation, the air flow sensing vanes can be positioned very close to the damper without creating dead air spaces such that reliable air flow sensing can be accomplished while keeping the station housing relatively compact.

7 Claims, 2 Drawing Sheets

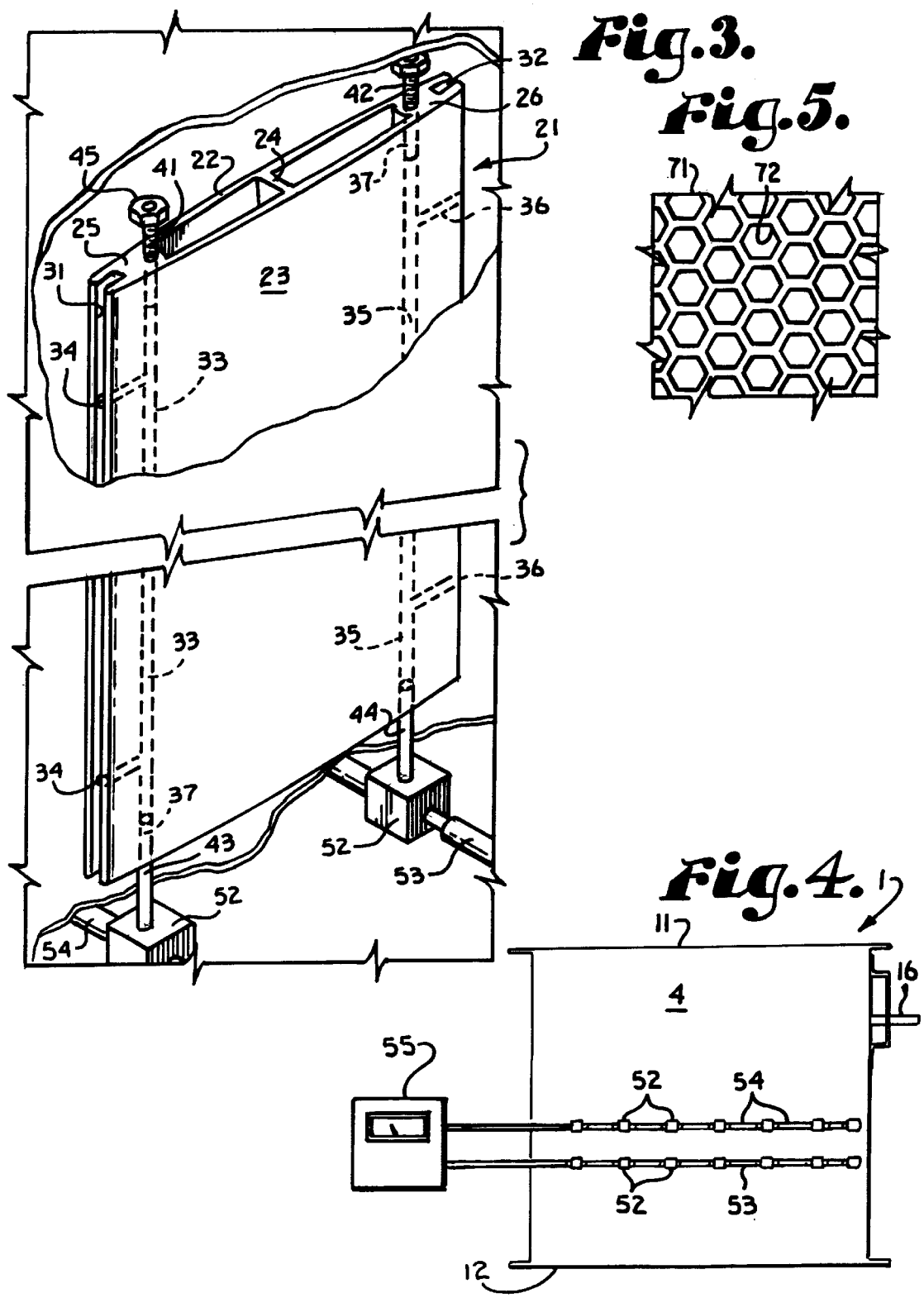

AIR FLOW MEASUREMENT STATION WITH ORTHOGONALLY MOUNTED DAMPER

FIELD OF THE INVENTION

The present invention relates to an air flow measurement station with orthogonally mounted damper, and, more particularly, to a station with a station housing which encloses a damper with a plurality of movable damper blades which are oriented in a first direction and a plurality of air flow sensing vanes which are oriented in a second direction orthogonal to the first direction. An air straightener can be housed as well.

BACKGROUND OF THE INVENTION

Heating and Air Conditioning (HVAC) systems for modern buildings and factories are generally precisely regulated to control the amount of outside air introduced into the system. In such systems, the designer must balance the need for energy conservation, which entails minimizing the amount of new outside air which must be introduced, and therefore heated or cooled, vs. the competing need for adequate fresh air ventilation to prevent the accumulation of stale air and the accompanying effects of so-called "sick building syndrome" on occupants.

Typically, in such controlled HVAC systems, outside air is introduced via selectively controllable dampers. For example, a damper can be a rectangular frame built into a wall communicating with the exterior of the building. Within the rectangular frame, a plurality of rotatable vanes are positioned, which vanes are selectively rotatable between a vertically oriented, completely closed position at which no air is introduced, and a substantially horizontally oriented, completely open position at which maximum air is introduced. Between these extreme positions are an infinite number of intermediate, partially open positions.

In order to accurately control the amount of ambient air introduced into a building, the air flow must be measured. A number of attempts have been made to associate pitot-static air flow sensing vanes with controllable dampers. A problem with the association of air flow sensors with dampers is the requirement for the sensors to be considerably removed from the damper to eliminate the effects from air flow turbulence created by the damper. Typically, with discrete dampers and air flow sensors, the minimum separation required is at least 2–3 diameters, i.e. 2–3 times the equivalent round diameter of the duct within which the damper and sensor is positioned. This separation is unacceptable in many applications and renders it difficult, due to the extended length, to place damper and sensors in a common housing.

It is clear then, that a need exists for a combined air flow measurement station and damper which can be included in a common housing of reasonable length and bulk. Such an air flow measurement station should allow accurate measurement of air flow through the damper without regard to damper blade position and turbulence.

SUMMARY OF THE INVENTION

The present invention is directed to an air flow measurement station with orthogonally mounted damper. The station includes a station housing with an air inlet opening and an air outlet opening. A movable blade damper is positioned proximate the inlet opening with movable damper blades within the damper being oriented in a first direction. A plurality of pitot-static air flow sensing vanes are positioned within the station housing downstream of the damper. The air flow sensing vanes are oriented in a direction orthogonal to the movable damper blades. By orienting the air flow sensing vanes orthogonal to the movable damper blades, accurate air flow measurement can be made when the vanes are positioned as close as 2.5 inches from the damper. This is due to the more laminar flow of air through the damper/sensor vane due to the elimination of dead air space at the sensors. An optional air straightening screen can be placed over the outlet opening of the station housing to compensate for the orthogonally oriented vanes. Even with the straightening screen, the station housing can be greatly shortened over prior art arrangements in which damper and sensing vanes were separated by a minimum distance equal to 2d, or twice the equivalent round diameter of the duct.

OBJECTS AND ADVANTAGES OF THE INVENTION

The principal objects of the present invention include: providing an air flow measurement station with orthogonally mounted damper; providing such an air flow measurement station and damper which fits within a station housing which is relatively compact; providing such an air flow measurement station and damper which reliably senses air flow regardless of the position of the damper blades; providing such an air flow measurement station and damper in which the orthogonal relationship between damper blades and air flow sensors creates a more laminar air flow due to the elimination of dead air spaces at the air flow sensors; providing such an air flow measurement station and damper which includes an air straightener positioned downstream of the damper and air flow sensors; and providing such an air flow measurement station and damper which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a greatly enlarged, fragmentary view of one of the air flow measurement vanes, as highlighted and labeled as "3" in FIG. 1, with portions of the housing broken away to illustrate upper and lower portions thereof.

FIG. 4 is a bottom plan view of the air flow measurement station showing the connection of multiple sensing vanes, in parallel, to a manometer.

FIG. 5 is a greatly enlarged, fragmentary, rear view of a portion of the air straightening screen illustrating the hex configuration thereof.

DETAILED DESCRIPTION OF THE INVENTION

Figure 1:
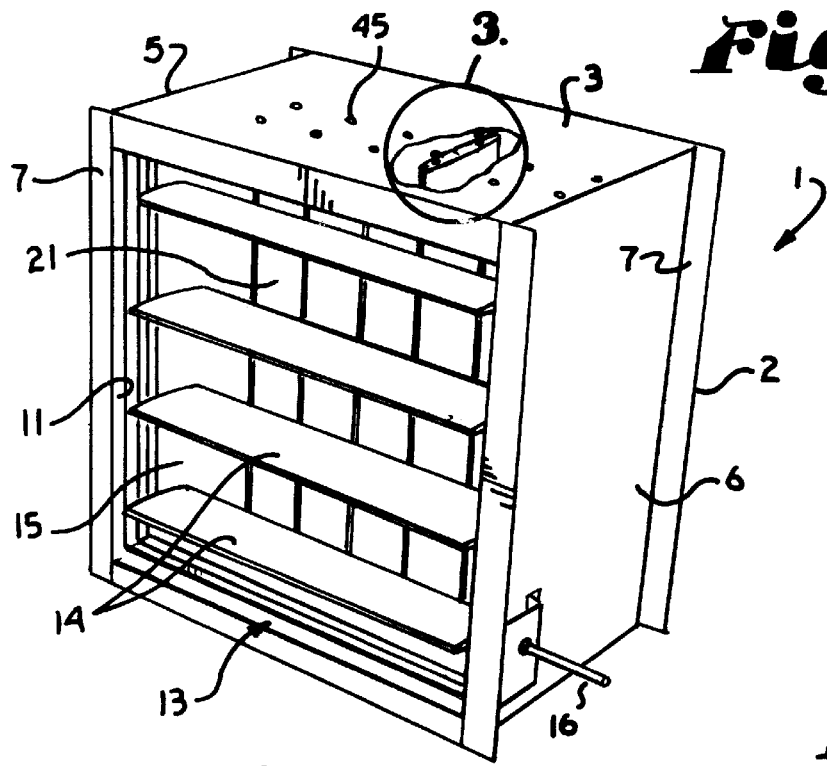
FIG. 1 is a perspective view of an air flow measurement station with orthogonally mounted damper.

As required, detailed embodiments of the present invention are disclosed herein, however, it is to be understood that the disclosed embodiments are merely exemplary of the invention, which may be embodied in various forms.

Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings, the reference numeral 1 generally indicates an air flow measurement station with orthogonally mounted damper in accordance with the present invention, hereinafter referred to simply as the "station 1".

The station 1 includes a station housing 2 with a top wall 3, bottom wall 4, left side wall 5 and right side wall 6 bordered by sealing flanges 7. The station housing 2 forms an air inlet opening 11 and an air outlet opening 12. A movable blade damper 13 is positioned within the housing 2 proximate the inlet opening 11. The damper 13 includes a plurality of movable blades 14, each of which positioned within a rectangular damper frame 15 in a generally horizontal orientation. Each blade 14 is movable simultaneously with the other blades 14 between an open position, as shown in FIG. 1 and a closed position (not shown) in well known fashion. A blade actuating shaft 16 extends outward through the right side wall 6 of the housing 2 for connection to a standard damper operating motor and linkage (not shown).

The station 1 also includes a plurality of pitot-static air flow sensing vanes 21 which are positioned within the housing 2 between the damper 13 and the air outlet opening 12. In one embodiment, the sensing vanes 21 were positioned as close as 2.5 inches from the damper blades 14, when the damper 13 is fully open, and still achieved satisfactory air flow measuring results. Preferably, the sensing vanes 21 are positioned within six inches of the damper blades 14.

Each of the plurality of pitot-static sensing vanes 21 is shaped as a symmetrical air foil, as shown in greater detail in FIG. 3. Each pitot static sensing vane 21 includes opposing curved sidewalls 22 and 23 connected by a central wall 24 as well as an upstream block 25 and a downstream block 26. The sidewalls 22 and 23 extend past the blocks 24 and 25 to form respective slots 31 and 32. The upstream block 25 includes a pitot pressure sensing chamber 33 extending along the length of each vane 21, which chamber 33 is preferably cylindrical in shape. A ram air aperture 34 is formed in the front end of the upstream block 25 with the aperture 34 communicating with the pitot pressure chamber 33. The downstream block 26 includes a static pressure sensing chamber 35 extending along the length of each vane 21, which chamber 35 is also preferably cylindrical in shape and identical in size to the chamber 33. A static air aperture 36 is formed in the rear end of the downstream block 26 with the aperture 36 communicating with the static pressure chamber 35. The pitot static sensing vane 21 can be made by extruding aluminum into the required shape.

Referring to FIGS. 1 and 3, each pitot static sensing vane 21 is attached between the top and bottom walls 3 and 4, respectively. A pair of threaded rods 41 and 42 extend into the chambers 33 and 35, respectively, from the top wall 3. An additional pair of threaded rods 43 and 44 extend into the respective chambers 33 and 35, respectively from the bottom wall 4. Each end of each chamber 33 and 35 has female threads 37 adapted to receive the respective rod 41-44. A respective one of a plurality of securing nuts 45 are tightened onto each exposed end of the threaded rods 41–44 to secure it into place, thus holding the respective pitot static sensing vane in place within the station housing 2.

Each threaded rod 43 and 44 is hollow tube which communicates with a respective pressure line Tee adaptor 52 such that the static chamber 35 in each pitot static sensing vane 21 is connected, in series, to a respective static pressure line 53 and each pitot chamber 33 is connected, in series, to a respective pitot pressure line 54 via an additional Tee adaptor. The pressure lines 53 and 54 are connected to a differential pressure measuring instrument or manometer 55 such that an output signal can be produced for controlling a damper motor (not shown), as represented schematically in FIG. 4.

As described in the U.S. Pat. No. 5,379,792 the pressure sensed in the pitot pressure line 54 constitutes both velocity pressure and static pressure while the pressure sensed in the static pressure line 53 constitutes static pressure only. The difference between the two sensed pressures is the differential or velocity pressure, which can be used by an operator to adjust the blade positions of the movable vanes 14 to effect the desired fluid flow through the station 1. As in the '792 patent, empirical testing of the pitot-static sensing vanes 14 reveals that, at most positions of the movable vanes 14, the measured velocity, as determined by the pitot-static sensing vanes 21 is multiplied by a factor of 3 or more over the actual velocity. This is presumably still due to downstream turbulence about the pitot-static sensing vanes 21, but the amplification of measured velocity can be useful. The amplification also may vary as a function of the position of the movable vanes 14, and a table can be easily created which relates measured to actual fluid velocity. The table can then be loaded as a look-up table into a calibration circuit (not shown), to allow adjustment based upon measured velocity compensated for damper position.

Figure 2:
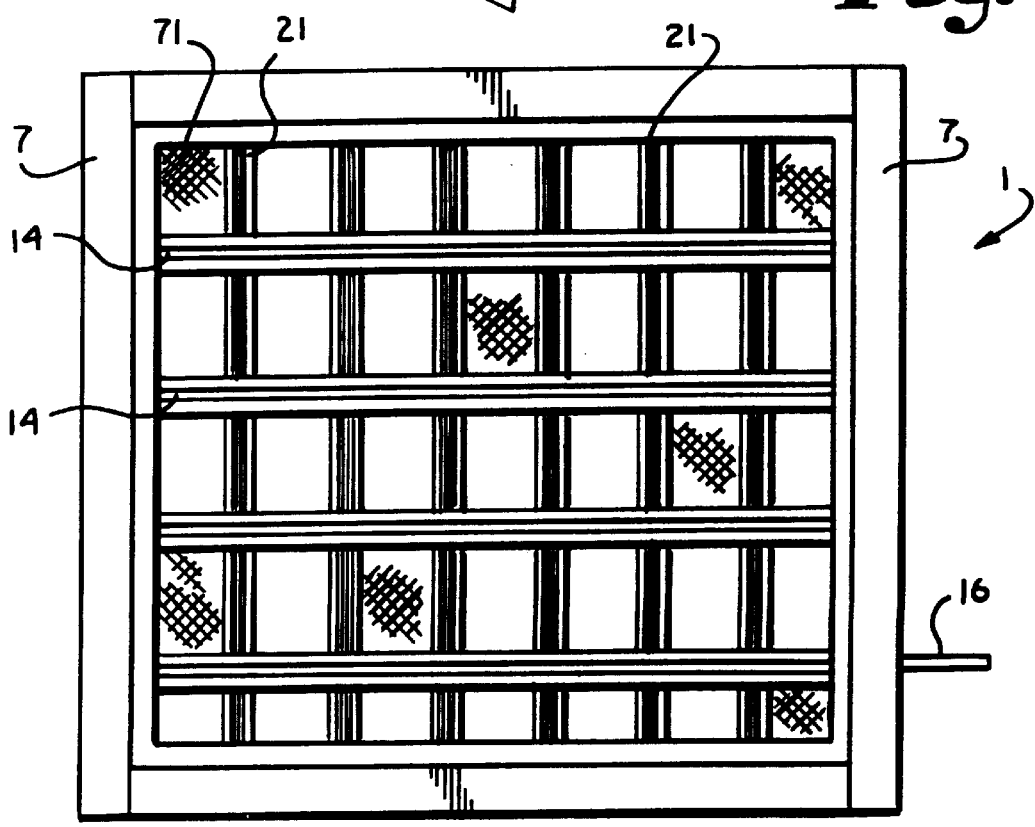
FIG. 2 is a front elevational view of the air flow measurement station with orthogonally mounted damper.

Referring to FIGS. 2 and 5, an air straightening screen 71 can be positioned proximate the outlet opening 12 of the station housing 2 to compensate for the downstream turbulence caused by the sensing vanes 21. The air straightening screen 71, for example, can take the form of hexagonal openings 72 in a known pattern, as illustrated.

The inventive station 1 has been illustrated and described as being of use for a fresh air inlet for an HVAC system, but it would be equally useful in other applications, such as for controlling any opening where fluid flow needs to be regulated. The specific shape of the movable vanes 14, the pitot static sensing vanes 21 and the pitot and static chambers 33 and 35 is representative, and other shapes might be successfully used.

It is thus to be understood that while certain forms of the present invention have been illustrated and described herein, it is not to be limited to the specific forms or arrangement of parts described and shown.

What is claimed and desired to be secured by Letters Patent is as follows:

1. An air measuring station, comprising:
   (a) a station housing with an inlet opening and an outlet opening;
   (b) a movable blade damper positioned in said station housing, said damper comprising a plurality of movable blades oriented in a first direction;
   (c) a plurality of air flow sensing vanes positioned in said station housing downstream from said damper, said air flow sensing vanes being oriented in a second direction which is substantially orthogonal to said first direction; and
   (d) said air flow sensing vanes being positioned less than 6 inches from said damper.

2. An air measuring station as in claim 1, and further comprising:

a. a pitot pressure line which is connected to each pitot chamber and to a differential pressure sensor such that pitot chambers of said air flow sensing vanes are linked to said differential pressure sensor; and b. a static pressure line which is connected to each static chamber and to said differential pressure sensor such that static chambers of said air flow sensing vanes are linked to said differential pressure sensor.

3. An air measuring station as in claim 2, wherein said differential pressure sensor comprises a manometer.

4. An air measuring station as in claim 1, and further comprising:

a. an air straightener positioned within said station housing downstream of said air flow sensing vane.

5. A method of packaging a damper including a plurality of movable blades with a plurality of air flow sensing vanes, and comprising the steps of:

(a) positioning the damper in a station housing such that the damper blades are oriented in a first direction;

(b) positioning said plurality of sensing vanes in said station housing downstream of said damper, with said sensing vanes oriented in a second direction substantially orthogonal to said first direction; and (c) positioning said air flow sensing vanes within 6 inches of said damper.

6. A method as in claim 5, wherein each of said air flow sensing vanes includes an upstream pitot chamber connected to an interior of said housing via a first orifice facing said damper and a downstream static chamber connected to the interior of said housing by a second orifice facing away from said damper, said method further the steps of:

a. connecting a pitot pressure line to each of said pitot chambers and to a differential pressure sensor such that said pitot chambers are linked in series to said differential pressure sensor; and b. connecting a static pressure line to each of said static chambers and to said differential pressure sensor such that said static chambers are linked in series to said differential pressure sensor.

7. A method as in claim 5, and further comprising the step of:

a. positioning an air straightener in said station housing downstream of said air flow sensing vanes.

* * * * *